Nov. 11, 1930.  M. W. CAUGHLAN  1,781,436
COMPOUND REFLECTOR
Filed Jan. 19, 1925
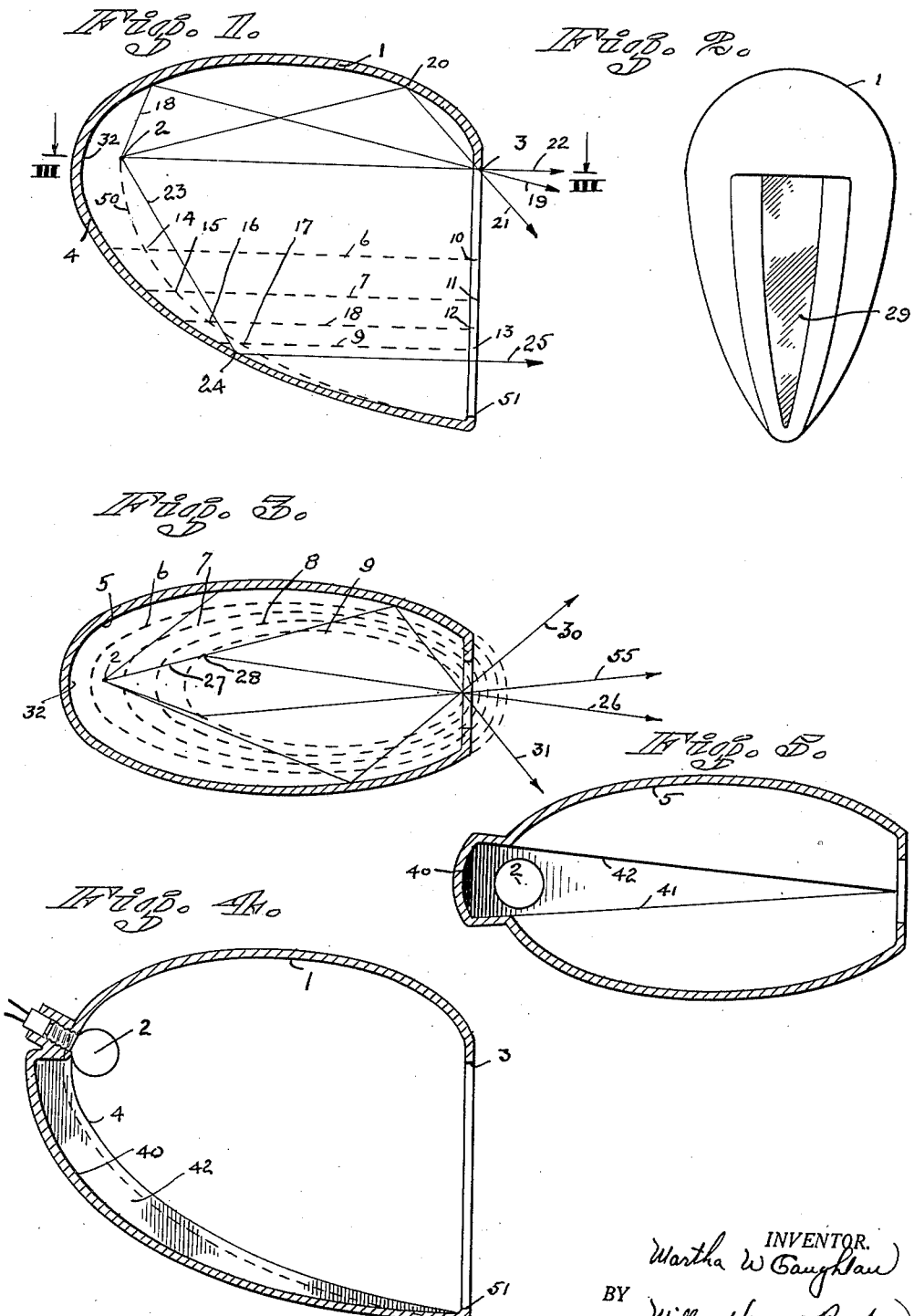

Patented Nov. 11, 1930

1,781,436

UNITED STATES PATENT OFFICE

MARTHA W. CAUGHLAN, OF OAKLAND, CALIFORNIA, ASSIGNOR TO AMERICAN WOOD-LITE CORPORATION, OF SAN FRANCISCO, CALIFORNIA, A CORPORATION OF CALIFORNIA

COMPOUND REFLECTOR

Application filed January 19, 1925. Serial No. 3,335.

My invention has for its principal object the attainment of an ideal distribution of light from a reflecting surface and is especially adapted to use in a lamp for illuminating the road with an ideal light field for vehicle use.

A further object of my invention is a device of the character described wherein the light emanating from the lamp is directed principally in a concentrated beam and from another portion of my surface in a relatively laterally divergent and a downwardly directed beam.

A further object of my invention is a device of the character described wherein the field of illumination produced by reflection from the said compound reflector consists of a relatively intense centrally projected light field and a relatively less intense side and downward illumination.

When using my invention in its preferred form the field in front of the vehicle is intensely bright over a maximum distance whereas the proximate portions of the field of illumination both centrally and at each side of the projected primary beam are illuminated from another portion of my reflecting surface.

A further object of my invention is a device of the character described constructed and adapted to eliminate the glare.

Other objects will appear from the drawing and specifications which follow.

These objects I attain by forming a compound reflector within which is positioned a lamp, or other light source and the upper portion above the horizontal plane passing through the lamp, is preferably formed substantially of an hemi-ellipsoid whose major axis passes through the lamp and one of whose foci is coincident with the lamp; and the lower portion of the reflector is formed of a series of diminishing ellipses whose major axes are parallel and in the same vertical plane as the major axis of the aforesaid ellipse of revolution, and whose foci remote from the lamp lie on a vertical line; and whose other foci lie on a parabola passing through said lamp.

Because of the properties of the hemi-ellipsoid and paraboloid surfaces in my reflector every ray of light emanating from a lamp placed at the proximate focus of the said hemi-ellipsoid will pass through its remote focus and every ray reflected upon the lower surface will pass through that line which is the locus of the remote foci of the diminishing ellipses. It is therefore necessary to provide only a narrow vertical slot in the front portion of my compound reflector through which all of the rays emanating from the compound surfaces will pass; and this I prefer to cover with a long narrow piece of glass, either plain or of lens form.

Where a very narrow projected primary beam is desirable the proximate focus of the hemi-ellipsoid will lie very close to the rear vertex of the ellipse, because of the increased ratio of the major to the minor axis, and for this reason it is difficult to introduce an electric lamp bulb, or other suitable source of illumination at the said proximate focus without interfering with the reflecting surface. In such cases I prefer to cut out a portion of the adjacent reflecting surface and introduce an offset supplementary reflecting surface therebehind.

By referring to the accompanying drawings my invention will be made clear.

Fig. 1 is a vertical central section through a compound reflector employing my invention.

Fig. 2 is a front view of such a reflector.

Fig. 3 is a cross sectional plan of Fig. 1 on the line III—III thereof.

Figs. 4 and 5 are similar to Figs. 1 and 3 respectively but showing a variation of my invention to allow for the structure of an incandescent lamp without losing the reflecting portions immediately back of the said lamp.

Throughout the figures similar numerals refer to identical parts.

The upper surface of my compound reflector as here shown is formed of a hemi-ellipsoid indicated by the numeral 1, the proximate focus thereof being located at 2, and the remote focus at 3.

The lower portion of the compound reflector consists of the surface whose vertical cross section is the parabola 4 and whose horizontal sections are successive ellipses as 5, 6, 7, 8 and 9.

The proximate focus of the ellipse 5 is at 2, and the remote focus is at 3, the ellipse 5, being the horizontal section through the hemi-ellipsoid 1.

The remote foci of the ellipses 6 to 9 are at 10, 11, 12, and 13 and lie on a vertical line 3, 51, which is therefore the locus of the remote foci.

The proximate foci of ellipses 6, 7, 8 and 9 will be at 14, 15, 16, and 17 respectively and their locus will be a parabola 50 passing through the proximate focus 2 of the hemi-ellipsoid 1.

Because of the mathematical properties of the conic sections here employed and the well known law of optics that the angle of incidence is equal to the angle of reflection, every ray of light originating at the focus 2 will be reflected upon the upper ellipsoidal surface 1 and thence through the remote focus 3.

One such a ray is shown at 18 which after reflection issues as the ray 19. Another ray from the same surface will be reflected at 20 and passing through the remote focus 3 will emanate as indicated by the arrow 21, and a direct ray without reflection will emanate as shown by the arrow 22.

All reflections upon the lower surface below the plane III—III of Fig. 1 will be reflected upon differential surface portions and emanate as horizontal lines or rays. One of said rays is indicated by the line 23 reflected at 24 and passing horizontally out as shown by the arrow 25. Another such ray is shown at 27 reflected at 28 and issuing at 26.

This is because the differential surface upon which every reflection takes place is in effect a surface element of a paraboloid of revolution whose focus is 2 and whose axis is parallel with the reflected ray passing horizontally through the locus of the remote foci.

The ellipses 6, 7, 8, 9 may be considered as horizontal sections through successive ellipsoids of revolution whose axes are lines passing through the focus 2 and thence respectively through the points 10, 11, 12 and 13 and these latter points are respectively common foci for the horizontal ellipses and the ellipsoids of which they are sections. It therefore follows that every ray emanating for the focus 2 and reflected upon my lower surface will pass horizontally out through the slot 29. This slot I prefer to form by cutting the reflector on a plane which is the locus of the latus rectums of the ellipses as 5, to 9.

Every vertical section and in fact every section other than the horizontal sections through the lower reflector, will cut the lower reflecting surface on a parabolic curve and all such sections as pass through the focus 2 and the slot or aperture 29 will be parabolic planes in which reflection takes place according to the well known law of the parabola and on the lower surface and resulting in outgoing substantially parallel rays.

It will now be seen that all of the light emitted from the focus 2 will be reflected upon the interior portions of my reflector and will emanate through the slot 29, and that the most intensive illumination emitted will be as fairly represented by the arrows 25, 55 and that there will be a secondary reflection from the upper portions of my compound reflector producing further illumination substantially represented between the arrows 30, 31, and a downward illumination below the horizontal 22, substantially bounded by rays 21, 22.

Where it is desired to make the beam between the arrows 55, 26, more concentrated; or in other words to reduce the divergence of the said beam, the proximate focus 2 of the ellipse 5 will be moved closer and closer to the proximate vertex at 32, because of the relative reduction in the minor axis as above set forth, and because of the physical dimensions of incandescent lamps employed as a source of illumination, the position of such a lamp will in many instances interfere with the reflector surface adjacent thereto. In such cases it is advisable to cut away a portion of the reflector surface and to position back of said lamp and removed from the said surface the necessary distance, a supplementary reflecting surface. One of several such possible constructions is shown at 40 in Figs. 4 and 5.

To secure a maximum reflection from this supplementary surface I prefer to form the latter as a segment of a paraboloid of revolution having its focus common with the proximate focus 2 of the ellipsoid. All rays reflected from the said supplementary surface will then pass out through the said slot 29 in horizontal lines.

In Figs. 4 and 5 such a supplementary surface is shown at 40 and in this instance it is formed of a wedge-shaped paraboloid segment being joined to the lower surface of the reflector on planes passing through the vertical locus of the remote foci, and through the ends of the latus rectums of the parallel ellipses and which planes are shown at 41, 42 respectively.

Such a construction enables the lamp and any conventional holding means to be fixed to the reflector with the lamp or hot portions clear of the reflecting surfaces and exactly at the focus 2 of the ellipsoid 1, parabola 4 and paraboloid 40.

Although I prefer to employ an ellipsoidal surface for the upper portion of my reflector, this is not necessary and the lower surface may be duplicated above the horizontal plane through the lamp. In other words the upper portion, above the horizontal lamp plane may be made symmetrical with or similar to the lower portion instead of ellipsoidal as shown.

I claim:

1. A compound reflecting surface comprising an upper concave portion of semi-ellipsoidal form, a lower portion consisting of a surface whose sections parallel with the axis of said ellipsoid are successively diminishing ellipses the locus of the remote focus of all of said ellipses being a straight line at right angles to said ellipses and whose proximate foci lie upon a parabola passing through the proximate focus of said ellipsoid.

2. A reflector having a surface as set forth in claim 1 wherein the portions of the ellipses beyond the remote foci are cut away for the passage of a light beam.

3. A reflector having a surface as set forth in claim 1 wherein the portions of the ellipses beyond the remote foci are cut away for the passage of a light beam and wherein a portion of said surface is removed back of the proximate focus of said ellipsoid and a supplementary reflecting surface is positioned therebehind.

4. A reflector having a surface as set forth in claim 1 wherein the portions of the ellipses beyond the remote foci are cut away for the passage of a light beam and wherein a portion of said surface is removed back of the proximate focus of said ellipsoid and a supplementary reflecting surface is positioned therebehind and is of parabolic form having a focus common with said proximate focus.

5. A reflector having a surface as set forth in claim 1 wherein the portions of the ellipses beyond the remote foci are cut away for the passage of a light beam and wherein a portion of said surface is removed back of the proximate focus of said ellipsoid and wherein an illuminating device is positioned at the proximate focus of the said ellipsoid.

6. A lamp having a reflecting surface whose horizontal sections are truncated ellipses and whose central vertical section is a parabola and a light source positioned at the proximate focus of the greatest ellipse, and an elongated vertical aperture about the locus of the remote foci of said ellipses.

7. A lamp as set forth in claim 6 wherein there is a recess provided in said surface to admit an incandescent bulb and a supplementary reflecting surface of parabolic form whose focus is substantially coincident with the said proximate focus positioned behind said recess.

8. A reflector for light projectors, comprising walls which in horizontal sections are elliptical and whose proximate focal points lie along an arc of a parabola.

9. A reflector for light projectors, comprising walls which in horizontal sections are elliptical, and whose proximate focal points lie along an arc of a parabola, and whose remote focal points lie on a substantially vertical straight line.

10. A reflector for light projectors, having a surface whose intersections by horizontal longitudinal planes are truncated ellipses having their remote foci on a vertical line, and whose intersections by a vertical plane rotating about a line through the remote foci are parabolas.

11. A reflector for light projectors, comprising an upper surface portion which is a hemi-ellipsoid and a lower surface portion which is a surface whose intersections by horizontal longitudinal planes are ellipses having their remote foci on a vertical line, and whose intersections by a vertical plane rotating about a line through the remote foci are parabolas.

12. A light projector having a surface portion which is the locus of the intersections of consecutive elements of a family of truncated ellipsoids with consecutive elements of a family of paraboloids, said ellipsoids and said paraboloids having a common focus, in combination with a light source located at said common focus.

13. A light projector having a surface portion which is the locus of the intersections of consecutive elements of a family of truncated ellipsoids with consecutive elements of a family of paraboloids, said ellipsoids and said paraboloids having a common focus, in combination with another surface portion of hemi-ellipsoid form and a light source located at the said common focus.

MARTHA W. CAUGHLAN.